(12) United States Patent
Nagel et al.

(10) Patent No.: US 9,334,956 B2
(45) Date of Patent: May 10, 2016

(54) PISTON UNIT

(75) Inventors: Philip Nagel, Augsburg (DE); David Breuer, Tuebingen (DE); Geoffrey Kermode, Kirkcaldy (GB); Khaled Tibari, Edinburgh (GB)

(73) Assignee: Robert Bosch GmbH, Stuttgart (DE)

( * ) Notice: Subject to any disclaimer, the term of this patent is extended or adjusted under 35 U.S.C. 154(b) by 616 days.

(21) Appl. No.: 13/811,518

(22) PCT Filed: Jul. 7, 2011

(86) PCT No.: PCT/EP2011/003392
§ 371 (c)(1),
(2), (4) Date: May 6, 2013

(87) PCT Pub. No.: WO2012/010262
PCT Pub. Date: Jan. 26, 2012

(65) Prior Publication Data
US 2013/0228071 A1    Sep. 5, 2013

(30) Foreign Application Priority Data

Jul. 23, 2010    (DE) .......................... 10 2010 032 056

(51) Int. Cl.
F04B 1/06 (2006.01)
F16J 1/00 (2006.01)
F04B 1/04 (2006.01)
F04B 1/107 (2006.01)

(52) U.S. Cl.
CPC ................. *F16J 1/00* (2013.01); *F04B 1/0408* (2013.01); *F04B 1/1071* (2013.01)

(58) Field of Classification Search
CPC .......... F04B 1/04; F04B 1/107; F04B 1/1071; F04B 1/0408; F01B 13/06
USPC ...................................................... 92/72, 178
See application file for complete search history.

(56) References Cited

U.S. PATENT DOCUMENTS

| 4,144,798 | A  | * | 3/1979 | Cyphelly ......................... 91/488 |
| 5,090,295 | A  | * | 2/1992 | Cunningham et al. ........... 91/491 |
| 6,276,909 | B1 | * | 8/2001 | Siegel et al. .................... 417/549 |
| 8,151,689 | B2 | * | 4/2012 | Dantlgraber ...................... 92/72 |

FOREIGN PATENT DOCUMENTS

| DE | 27 31 474 A1 | 1/1978 |
| DE | 39 19 456 A1 | 12/1990 |
| DE | 40 37 455 C1 | 2/1992 |
| DE | 197 47 936 A1 | 2/1999 |

OTHER PUBLICATIONS

International Search Report corresponding to PCT Application No. PCT/EP2011/003392, mailed Oct. 6, 2011 (German and English language document) (6 pages).

* cited by examiner

*Primary Examiner* — Thomas E Lazo
(74) *Attorney, Agent, or Firm* — Maginot, Moore & Beck LLP

(57) ABSTRACT

A piston unit for a radial piston machine includes a piston and a roller or a roller element. The roller or roller element has a circular cylindrical jacket apart from a chamfer. A hydrostatic pressure- or force-relief element is provided in a contact area between the piston and the roller. The hydrostatic pressure- or force-relief element forms a pressure field in the contact area. The roller or roller element also has one or two end-face holes. Due to the hole(s), the roller is slightly weakened at the associated end section such that Hertzian stress is reduced at the same associated end section.

9 Claims, 2 Drawing Sheets

PISTON UNIT

This application is a 35 U.S.C. §371 National Stage Application of PCT/EP2011/003392, filed on Jul. 7, 2011, which claims the benefit of priority to Serial No. DE 10 2010 032 056.0, filed on Jul. 23, 2010 in Germany, the disclosures of which are incorporated herein by reference in their entirety.

The disclosure relates to a piston unit, which comprises a piston and a roller, for a radial piston machine, as per the description below.

BACKGROUND

In the case of piston units for radial piston machines, various approaches are known.

Document DE 40 37 455 C1 presents a radial piston machine having a plurality of cylinders arranged in a stellate manner in a rotor. Each cylinder is assigned a piston unit. The piston unit has a stepped piston which is supported radially to the outside via a respective roller on a stroke cam of the radial piston machine. Since the stroke cam is formed as a stator and has an undulating shape, the stepped piston performs an oscillating stroke movement when the rotor rotates. The rollers are of circular cylindrical form over their entire length.

A disadvantage of such piston units is the friction that arises between the stepped piston and the associated roller. Furthermore, a high Hertzian stress generated in particular at the end portions of the circular cylindrical rollers is disadvantageous.

To reduce the Hertzian stress, it is known according to the prior art to provide continuous diameter reductions, that is to say crowned formations, at the end portions of the rollers.

Document DE 27 31 474 A1 presents piston units in which a pressure relief means is provided between a piston and a roller. Said pressure relief means has a shallow depression arranged on the piston in a region of contact with the roller. Said shallow depression is charged with working pressure from the associated cylinder via a duct which extends through the piston.

The length of a depression of a pressure relief means of said type is restricted in the case of crowned rollers because the depression can extend only along the circular cylindrical portion of the roller.

Accordingly, document DE 27 31 474 A1 presents a piston unit with a pressure relief means and with a hollow cylindrical roller which has a relatively thin and weak wall. Here, the interior of the roller is charged with working pressure of the associated cylinder. In this way, the Hertzian stress of the weakened roller caused by contact with the stroke cam is reduced.

A disadvantage of the latter piston unit is the outlay in terms of apparatus for the reduction of the Hertzian stress.

SUMMARY

By contrast, it is the object of the disclosure to provide a piston unit with a pressure relief means, which piston unit offers a very high relief force. Here, the Hertzian stress should be reduced with little outlay.

Said object is achieved by means of a piston unit having the features described below.

The piston unit according to the disclosure of a radial piston machine has a piston and a roller or a roller body which—aside from a bevel or the like—has a circular cylindrical shell. In a region of contact between the piston and the roller there is provided a hydrostatic pressure or force relief means which forms a pressure field there. In this case, the roller has an end-side recess. By means of said recess, the roller is weakened slightly at an associated end portion, such that the Hertzian stress is reduced with minimum outlay.

Further advantageous embodiments of the disclosure are described below.

In a preferred refinement, the roller has two end-side recesses which are approximately concentric and which are surrounded in each case by an approximately concentric ring portion. A main portion composed of solid material is arranged between the two weakened ring portions.

In a preferred embodiment, the pressure relief means has a shallow depression which is arranged on the piston in the contact region. Here, the depression is connected via a duct to an inner end face or to an encircling surface of the piston. Said surfaces are working surfaces of the piston and are therefore charged with working pressure.

It is particularly preferable here for the depression to extend substantially over an entire length of the roller. The pressure field and thus the relief force are thus maximized. In this way, for example in the case of a radial piston motor, the starting efficiency thereof is improved.

The depression is preferably slightly shorter than the shell of the roller, such that in each case one sealing region remains between the depression and the respective end surface of the roller.

In one embodiment of the piston unit according to the disclosure, in order to set a predetermined stiffness and a damping action and to prevent any material fatigue of the associated end portion, the recess is filled with plastic.

It is preferable here for the plastic to be an elastomer.

In one refinement, to create a high-displacement stepped piston (HD) with increased delivery volume in relation to the prior art, a main portion is provided which is radially widened in relation to a shank portion and which is longer along an axis of rotation than perpendicular thereto.

The piston may have a core and a metallic encapsulation or an encapsulation composed of plastic, which has a lower hardness than the core. Here, the core can perform stability and supporting functions of the piston, whereas the encapsulation can perform sealing functions with respect to the cylinder and the roller. Furthermore, a fit tolerance of the cylinder with a piston of said type is reduced, whereby the production outlay for the piston unit according to the disclosure is reduced. Furthermore, the leakage and/or the friction between the piston and the cylinder can be reduced, whereby the efficiency of the corresponding radial piston machine is improved.

BRIEF DESCRIPTION OF THE DRAWINGS

Various exemplary embodiments of the disclosure will be described in detail below on the basis of the figures, in which.

DETAILED DESCRIPTION

Figure 1:
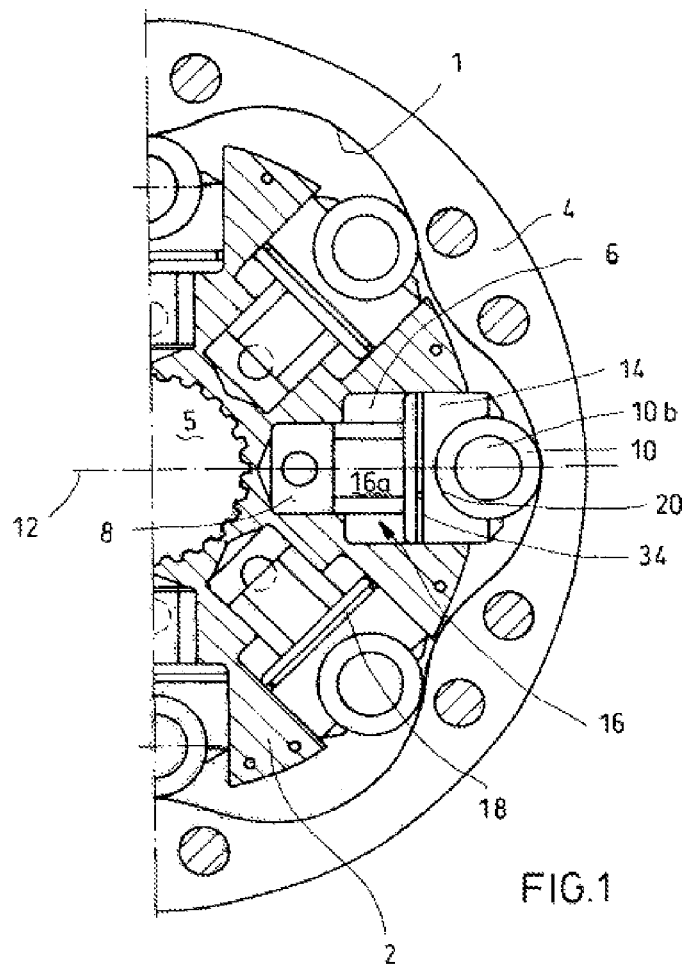
FIG. 1 shows a part of a radial piston machine in section from a side elevation, with a first exemplary embodiment of a piston unit according to the disclosure.

FIG. 1 shows a detail of a radial piston machine with a first exemplary embodiment of piston units 14, 16, 10 according to the disclosure in a sectional illustration from a side elevation. The radial piston machine has an encircling, undulating stroke cam 1 and eight cylinders 6, 8 with corresponding piston units 14, 16, 10, of which only three are illustrated completely, and two more are illustrated in part, in FIG. 1. The cylinders 6, 8 are arranged radially or in a stellate manner in a rotor 2, whereas the stroke cam 1 is formed on a stroke disk 4. The rotor 2 and stroke disk 4 can rotate relative to one another. A radial piston machine of the type shown is conventionally utilized as a hydraulic motor, wherein the rotor may be fastened via the shaft 5 or the stroke cam to the element to be driven.

Each cylinder 6, 8 has a main portion 6 and, on its side facing toward the shaft 5, a radially recessed guide portion 8.

Each piston unit 14, 16, 10 has a roller 10 which, as the rotor 2 rotates, rolls along the stroke cam 1 and, in so doing, performs an oscillating stroke movement with respect to a longitudinal axis 12. Here, a roller 10 is mounted in each stepped piston 14, 16. Each stepped piston has a main portion 14 and a shank portion 16. The main portion 14 of the stepped piston bears against the roller 10 and is received in the main portion 6 of the cylinder, whereas the shank portion 16 of the stepped piston is received in the guide portion of the cylinder. Into the main portion 14 of the stepped piston there is formed an encircling groove 18 in which a slotted metallic sealing ring 34 is received. In FIG. 1, the sealing ring 34 is shown on one of the piston units, whereas the sealing ring has been omitted in the case of the other piston units in order to illustrate the groove 18.

In a region of contact 20 between the main portion 14 of the stepped piston and the roller 10 there is provided a pressure relief means (not shown in any more detail in FIG. 1).

Figure 2:
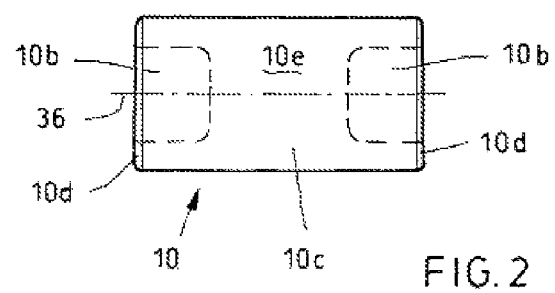
FIG. 2 shows a roller of the first exemplary embodiment of the piston unit according to the disclosure in one view.

FIG. 2 shows the roller 10 of the first exemplary embodiment of a piston unit according to the disclosure in one view. A shell 10c of the roller 10 is of circular cylindrical form aside from a respective bevel 10d. It is thus possible for a shallow depression, provided on the main portion 14 of the stepped piston, of the pressure relief means (not shown in FIG. 2) to extend along an axis of rotation 36 of the roller 10 over the major part of the shell 10c.

In the interior of the roller 10 there are provided two end-side recesses 10b. Said recesses are formed into the respective end side of the roller 10 concentrically along the axis of rotation 36, and are not continuous. A main portion 10e thus remains in the interior of the roller 10 between the two recesses. The recesses 10b permit a deflection of the end portions of the roller 10 and thus a reduction of the Hertzian stress.

Figure 3A:
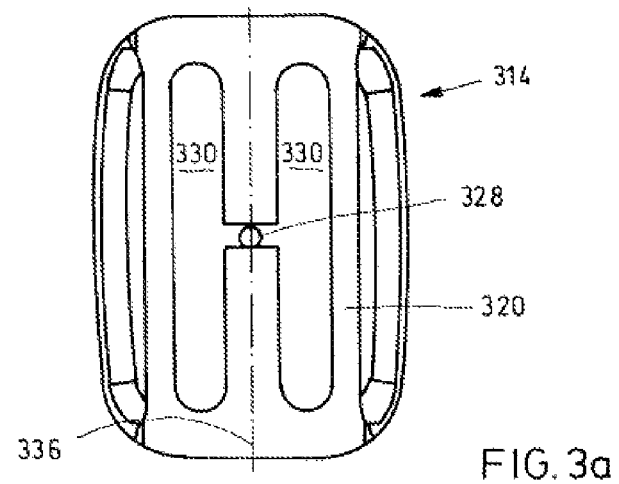
FIGS. 3a-3c show a stepped piston according to a second exemplary embodiment of the piston unit according to the disclosure.

FIG. 3a shows a stepped piston of a second exemplary embodiment of a piston unit according to the disclosure in a view from below. A main portion 314 is elongated along an axis of rotation 336 of the roller (not shown in FIG. 3a) in relation to the first exemplary embodiment, such that the main portion 314 has a heavily rounded (in the broadest sense) rectangular form. A delivery or suction volume of the stepped piston in conjunction with a correspondingly shaped cylinder is thus increased.

Furthermore, a shallow depression 330 which, for pressure relief, is charged with high pressure via a duct 328 is divided into two partial regions. Here, depending on the respectively prevailing inclination of the stroke cam (cf. FIG. 1) and the corresponding oblique orientation of the force loading of the roller, in each case one of the two partial regions of the depression 330 performs a major part of the pressure relief.

Figure 3B:
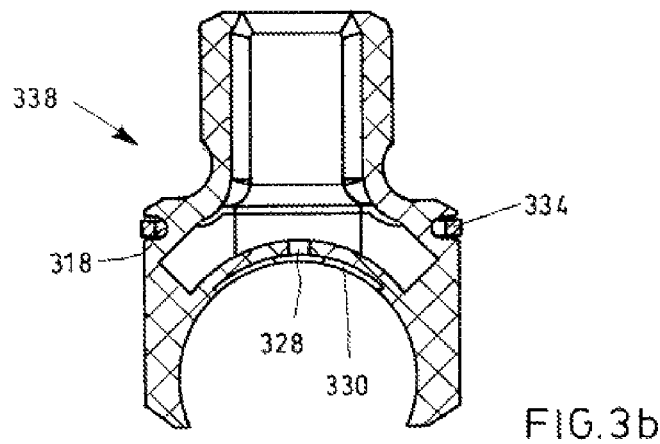
Figure 3C:
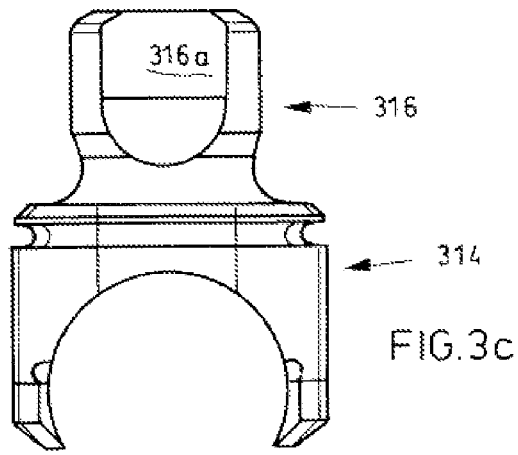

The stepped piston as per FIGS. 3a to 3c has a core (not shown in any more detail) formed from iron or a steel, said core being surrounded by an encapsulation 338 formed from relatively soft and elastic material, for example from a metal but in particular from a plastic. The core is extrusion-coated with the plastic, wherein the desired outer shape of the piston can be formed in an extremely simple manner. The relatively soft material can deform slightly under loading, such that the loading between the piston and rotor is distributed over a larger area. The depressions 330 for the pressure relief of a roller can be generated already as the plastic is injection-molded on. The rollers can run directly against the plastic.

FIG. 3b shows a piston having an encapsulation 338 composed of plastic in a sectional illustration from a side elevation. The encapsulation 338 also serves to compensate for or tolerate fit inaccuracies firstly between the stepped piston and the associated cylinder and secondly between the stepped piston and the associated roller.

It can be clearly seen that (in FIG. 3b) a sealing ring 334 is received in an encircling groove 318 in the encapsulation 338. Said sealing ring is of slotted form and is composed of metal.

FIG. 3c shows the stepped piston of the second exemplary embodiment of a piston unit according to the disclosure in a view from the side. A shank portion 316 of the stepped piston has two recesses formed by respective flattened portions, of which only one recess 316a is shown in FIG. 3c. Said recesses serve for producing a pressure medium connection between the two pressure or working chambers formed between the stepped piston 314, 416 and an associated cylinder (not shown in FIG. 3).

As a result of the elongation of the main portion 314 and of the main portion of the corresponding cylinder, it is possible firstly to make the guide length between the piston unit and rotor large and secondly, by means of a large cross section of the main portion 314, to obtain a large suction or delivery volume of the radial piston machine.

Disclosed is a piston unit for a radial piston machine, which piston unit has a piston and a roller or a roller body which—aside from a bevel or the like—has a circular cylindrical shell. In a region of contact between the piston and the roller there is provided a hydrostatic pressure or force relief means which forms a pressure field there. In this case, the roller has one or two end-side recesses. By means of said recess(es), the roller is weakened slightly at an associated end portion, such that the Hertzian stress is reduced there.

The invention claimed is:

1. A piston unit for a radial piston machine, comprising:
a piston;
a roller having a circular cylindrical shell and a first end-side recess in a first end-side portion of the roller; and
a hydrostatic pressure relief mechanism configured to act in a region of contact between the piston and the roller;
wherein the first end-side recess does not extend to a second end-side portion of the roller, the second end-side portion opposite the first end-side portion.

2. The piston unit as claimed in claim 1, further comprising a second end-side recess in the second end-side portion of the roller, wherein:
the second end-side recess does not extend to the first end-side portion,
the first end-side recess and the second end-side recess are approximately concentric,
each of the two end-side recesses are surrounded by an approximately concentric ring portion, and
a main portion is arranged between the two ring portions.

3. The piston unit as claimed in claim 1, wherein:
the pressure relief mechanism has a shallow depression arranged on the piston in the region of contact, and
the depression is connected via a duct to one of an inner end face and an encircling surface of the piston.

4. The piston unit as claimed in claim 3, wherein the depression extends substantially over an entire length of the roller.

5. A piston unit for a radial piston machine, comprising:
a piston;
a roller having a circular cylindrical shell and an end-side recess; and
a hydrostatic pressure relief mechanism configured to act in a region of contact between the piston and the roller,
wherein the end-side recess in the roller is filled with plastic.

6. The piston unit as claimed in claim 5, wherein the plastic is an elastomer.

7. The piston unit as claimed in claim 1, wherein:
the roller has an axis of rotation,
the piston has a main portion having a length along the axis of rotation that is longer than a width perpendicular to the axis of rotation.

8. The piston unit as claimed in claim 1, wherein:
the piston is a stepped piston having a core and an encapsulation, and
the encapsulation has a lower hardness than the core.

9. The piston unit as claimed in claim 8, wherein the encapsulation is formed from metal.

* * * * *